Sept. 3, 1963 E. A. PIRSH ETAL 3,102,789
DETERMINATION OF IRON IN BOILER WATER
Filed April 1, 1959 2 Sheets-Sheet 1
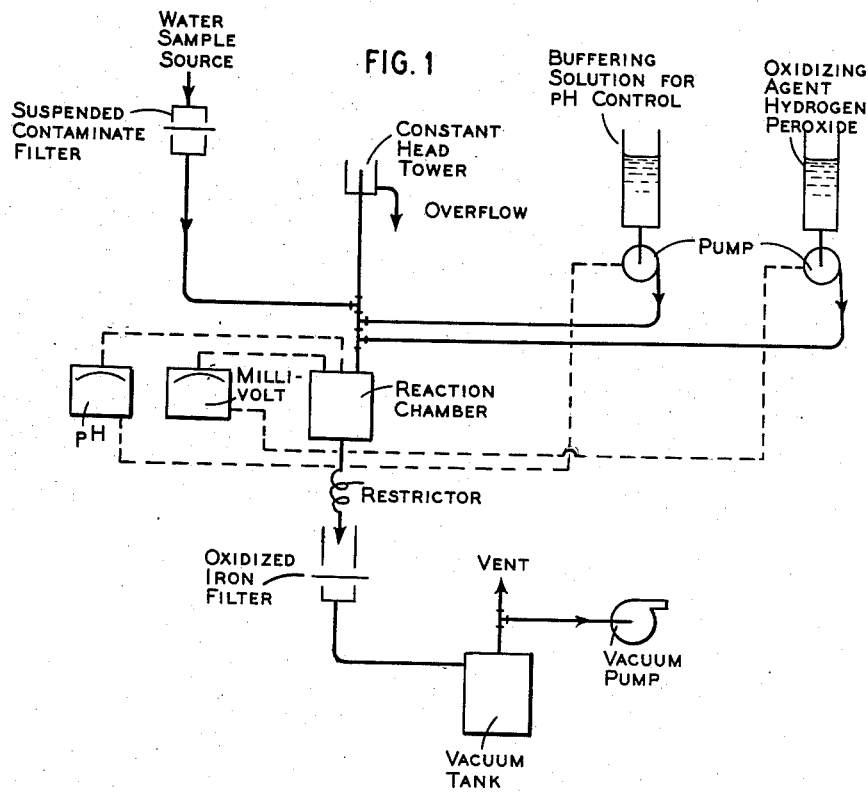
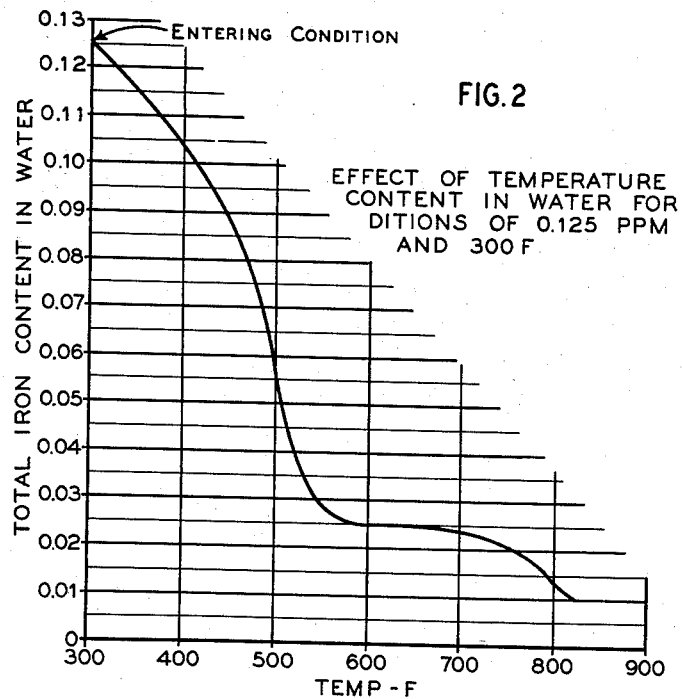
INVENTORS
Edward A. Pirsh
Nathan L. Dickinson
Donald N. Felgar
ATTORNEY

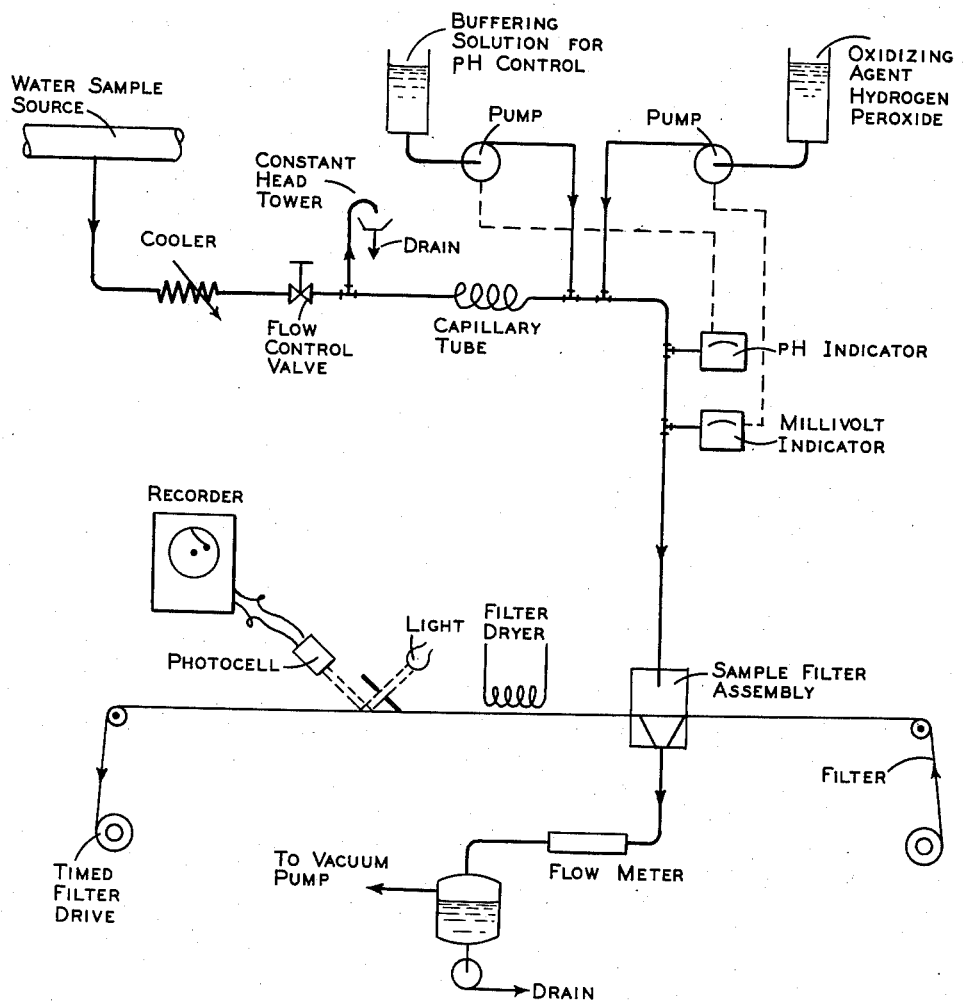

3,102,789
Patented Sept. 3, 1963

3,102,789
DETERMINATION OF IRON IN BOILER WATER
Edward A. Pirsh and Nathan L. Dickinson, Akron, Ohio, and Donald N. Felgar, Palos Verdes Estates, Calif., assignors to The Babcock & Wilcox Company, New York, N.Y., a corporation of New Jersey
Filed Apr. 1, 1959, Ser. No. 803,443
4 Claims. (Cl. 23—230)

The present invention relates to a method of and apparatus for the determination of the iron content in boiler water, and more particularly to a system for obtaining a quick, reliable check on the total iron content in the boiler water.

In the generation and heating of steam particularly at high pressures, the presence of iron in solution and/or suspension in the boiler water may become critical, since it will deposit within the flow passageways of the steam generating and superheating elements so as to foul the interior walls of the heat exchange surfaces. Such iron deposits are highly selective and tend generally to deposit in high temperature zones of the steam generating and heating surfaces. Thus, the problem of iron deposition becomes especially serious at supercritical operating pressures, and while the problems attendant on iron deposition are known, procedures for accurately determining the iron content in the boiler water, as heretofore used, are slow and costly, and generally inadequate for field use.

In the present invention, a method of quickly determining the iron content of boiler feed water is provided, and an apparatus suitable for the performance of the method is disclosed. The iron content of the boiler feed water is determined by continuously obtaining a sample of the boiler feed water, continuously maintaining the water sample at a controlled pH by the addition of chemicals thereto and thereafter oxidizing the iron in the boiler feed water sample. The chemically treated sample is passed in a measured volume through a filtering medium which retains the iron oxide, producing a coloration of the filter which is proportional to the amount of iron contained in the sample. The colored filter is thereafter optically compared manually or automatically with known color standards to provide a quantitative value of the total iron in the feed water sample.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Of the drawings:

FIG. 1 is a schematic illustration of apparatus for performing the method of the present invention;

FIG. 2 is a curve showing the effect of temperature on total iron content in water for initial conditions of 0.125 p.p.m. total iron and 300 F.; and FIG. 3 is a schematic illustration of a modified apparatus for performing the method of the present invention.

As shown in FIG. 2, the rate of deposition of iron on the water side of heat exchange surfaces increases with increase in temperature. Thus, the operation of a steam generator and superheater at elevated pressures and temperatures emphasizes the role of temperature in the deposition characteristics of the iron from the feed water. As a result, in both subcritical and supercritical pressures in steam generators, the iron content in the feed water must be maintained at a preselected low value to avoid deposition of the iron in the fluid flow circuits. When the iron content of the feed water exceeds predetermined values selected for a particular operating pressure the iron deposition can lead to rapid overheating of the tubular elements in the steam generating and superheating unit. Such overheating may lead to possible early failures of the metal conduits defining the fluid flow paths.

The iron in the feed water may be in solution and/or in suspension, may be present as iron and/or as iron oxide, and usually originates in the steam condensing, feed water heating and the low temperature conduit portions of the heat exchange cycle. The pick-up of iron in the cooler portions of the closed cycle can be minimized by maintaining high alkalinity values, as, for example, a pH of 9.0 to 9.5 in the boiler feed water.

When generating steam at supercritical pressure, for example, 4500 p.s.i. (pounds per square inch), the maximum iron content in the feed water should not exceed .010 p.p.m. (parts per million) to avoid serious accumulations of iron on the water and/or steam side of the heat exchange elements. For lower pressure, somewhat higher maximum iron contents may be tolerated, and conversely, for higher pressures lower maximum iron contents are desirable. With a maximum iron content in the feed water such as indicated for the pressure given, we have found that a longer time is involved in accumulating a serious deposition of iron in the unit than that occasioned by normal operating schedules. Thus, within the limits given for the iron content in the feed water, sustained operation of a high pressure boiler is possible without overheating from internal iron accumulation in the tubes.

The reasons for the incidence and location of the iron depositions under high pressure steam generating and heating conditions is not completely understood, although some plausible theories have been advanced to explain this action. One theory suggests the possibility of a catalytic action between hot iron and steam or water whereby the iron in solution in the water is converted to iron oxide and deposited on the internal surfaces of the tubes confining the flow of the fluid. Regardless of the reasons for the iron deposition, it has been definitely proven that such depositions occur and can lead to serious difficulties in the operation of supercritical pressure boilers. The most practical and convenient method of avoiding such difficulties is to limit the iron content of the boiler feed water. However, from a practical standpoint, this necessitates a quick, convenient and accurate method for determining the iron content in the boiler feed water. Such a method and the means necessary for its performance must be available for periodic or continuous use during the operation of the steam generating and heating unit.

While we have found that fairly accurate feed water iron content determinations may be made by merely filtering a standard volume of water sample through a proper filter medium, we have also found that a varying proportion of the total iron content in the feed water will be in solution and pass through the filter with the water. Under these conditions, the accuracy of the determination of the total iron content in the feed water is insufficient to protect the operation of a boiler. To overcome this inaccuracy in the determination of the total iron content in the feed water, we oxidize the iron in the feed water sample so that all of the iron present will be in the oxidized form and thus recoverable on the filter when the sample is passed through a proper filtering medium.

The oxidation of the iron in the feed water sample can be accomplished by agitation of the sample in the presence of air or oxygen but such a procedure requires an excessively long time to insure oxidation of all of the iron originally in solution in the boiler feed water. We have found that this oxidation process can be quickly and completely performed by the use of hydrogen peroxide, added to the water sample before filtration. The hydrogen peroxide is a most acceptable oxidant since it quickly oxidizes all of the iron present without producing any side reaction contamination which could influence the accuracy of the iron determinations.

We have also found that a considerable portion of the iron oxide in suspension in the boiler feed water sample will be in the one micron or less size range. Thus, it is considered desirable to utilize a filter capable of retaining particles of a size approaching ½ micron. Specifically, we have found that a Millipore filter, as manufactured by the Millipore Filter Corp., is a suitable filtering medium. This filter has openings having an average dimension of approximately .45 micron. Using such a filter, substantially all of the iron oxide present in the sample being tested will be retained on the filtering medium.

After the sample of boiler feed water has been corrected for alkalinity, oxidized by the use of hydrogen peroxide and passed through the filter, the residue returned on the filter is then compared, as to color, with a corresponding standardized color scale to ascertain the iron content of the boiler feed water sample.

While we have found that maintaining the alkalinity of the sample in the range of from 6 to 9.6 pH will give consistently reproducible color determinations of the iron content in the water, we prefer to use a pH value of between 7.2 and 7.6 in the sample for producing the sharpest color gradations indicative of the iron content of the sample. This can be accomplished by the use of a buffering solution, such as hydrochloric acid or sodium hydroxide.

In comparing the color of the iron oxide residue on the filter with a standard, it is necessary to utilize prepared standardized color sample which have been calibrated on the basis of precise chemical determination of iron content of the samples tested. Once proper color standard has been established, an accurate comparison of subsequent colored filter samples will give an accurate quantitative determination of the iron content of boiler feed water sample. It is possible to obtain acceptably accurate visual color comparisons by means of the eye alone. However, for the greatest possible accuracy, we prefer to use photo-electric means of well known type for such color comparisons. We have found through repeated tests that the method described is reliable and accurate, indicating as little as 5 p.p.b. (parts per billion) of iron in boiler feed water samples. Such sensitivity and accurate reproducibility of iron content determinations for the purposes indicated is completely adequate for regulating the iron content of the feed water delivered to a supercritical pressure boiler.

In the usual operation of a boiler of the type described, there will, of course, be other contaminants in the boiler feed water. Such contaminants may include silica and copper, for example. While copper, if present in any appreciable amount, will modify the characteristic color of the iron oxide retained on the filter, the usual, small amount of copper in the boiler feed water is insufficient to adversely affect the accuracy of the determination described. However, if under unusual operating conditions copper is present in quantities exceeding, for example, 2 p.p.m., it is possible to chemically remove the copper by precipitation and filtration without affecting the iron content of the sample. When this is done, such removal of copper should occur before the oxidation of the iron by means of the hydrogen peroxide. Ordinarily, the other contaminants in the boiler feed water will not influence the color of the iron oxide retained on the Millipore filter.

An apparatus suitable for performing the above described method is illustrated in FIG. 1 of the drawings. As shown, a continuous sample of boiler feed water is passed through a conduit to a reaction chamber. The reaction chamber is supplied with chemicals by means of a chemical feed pump so as to supply the necessary pH control chemicals as well as the hydrogen peroxide. The quantities of each are controlled by the usual pH control electrodes and a Millivolt indicator which is operated on the conductivity of the boiler feed water sample. The Millivolt indications will give a calibrated indication of the iron oxide present in the reaction chamber and the supply of hydrogen peroxide may be governed thereby.

With the properly prepared sample of the boiler feed water maintained in the reaction chamber by use of a constant head overflow tower, a measured volume, for example, one liter of the sample, is passed through a Millipore filter or the like for the retention of the oxidized iron on the filter. The filter is operated under vacuum, provided by a vacuum tank and a vacuum pump. After the water has passed through the filter, the filter is removed for comparison with the color standard. With the apparatus described, a continuous sample of the boiler feed water is maintained in the reaction chamber and periodically, as desired, a test sample is withdrawn for filtration and subsequent color comparison. In this manner, frequent determinations of the iron content of the boiler feed water may be made and the boiler adequately protected against introduction of excessive iron in the feed water.

As shown in FIG. 3, the invention is illustrated as applied in a continuous measurement of the iron content of the boiler water. Instead of periodically passing a selected volume of treated boiler water through a filter to obtain a deposition of iron oxide thereon for subsequent color comparison, FIG. 3 illustrates apparatus for continuous determination of the iron content in boiler water. As shown, the water sample is continuously withdrawn from the steam generating unit and continuously passed through a cooler, and a necessary flow control valve, a capillary tube. The sample is continuously treated by buffering chemicals to obtain the desired pH value and to oxidize the iron by hydrogen peroxide. Thereafter, the boiler water is passed at a controlled flow rate through a strip of filtering medium, which is moving either at a continuous or step by step rate to entrap the iron oxide present in the water sample being treated. As shown, the filtering medium, with entrapped iron oxide is passed through a drying stage and then tested by reflected light transmitted to a photocell for recording of the comparison color of the residue with respect to a color standard. The recorded value may be converted to actual boiler feed water iron content.

While in accordance with the provisions of the statutes we have illustrated and described herein the best form and mode of operation of the invention now known to us, those skilled in the art will understand that changes may be made in the form of the apparatus disclosed without departing from the spirit of the invention covered by our claims, and that certain features of our invention may sometimes be used to advantage without a corresponding use of other features.

What is claimed is:

1. The method of determining the iron content of boiler feed water which comprises the steps of obtaining a sample of said boiler feed water, maintaining the alkalinity of said sample at a pH value not exceeding 9.6, introducing hydrogen peroxide to said feed water sample to oxidize the iron in said sample, filtering a selected volume of said sample to retain iron oxide on the filter, and comparing the color of said retained iron oxide with a color standard to obtain a quantitative value of the iron in said boiler feed water sample.

2. The method of determining the iron content of boiler feed water which comprises the steps of obtaining a sample of said boiler feed water, adjusting the pH of said sample to obtain a value between 6 and 9.6, introducing hydrogen peroxide to said adjusted feed water sample to oxidize the iron in said sample, filtering a selected volume of said sample to retain iron oxide on the filter, and comparing the color of said retained iron oxide with a color standard to obtain a quantitative value of the iron in said boiler feed water sample.

3. The method of determining the comparative iron content of boiler feed water which comprises the steps of obtaining a continuous sample of said boiler feed water, adjusting the pH of said sample to obtain a value between 7.2 and 7.6, introducing hydrogen peroxide to said adjusted feed water sample to oxidize substantially all the iron in said sample, filtering a selected volume of said sample to separate iron oxide from the water of said sample and to retain substantially all of the iron oxide on said filter, and comparing the color of the iron oxide retained on said filter with a color standard to obtain a quantitative value of the iron in said boiler feed water.

4. The method of determining the comparative iron content of boiler feed water as it is being fed into the boiler system which comprises the steps of obtaining a continuous sample of said boiler feed water, filtering contaminants other than iron from said sample, adjusting the pH of said sample to obtain a value between 7.2 and 7.6, introducing hydrogen peroxide to said adjusted feed water sample to oxidize the total iron in said sample, filtering a selected volume of said sample to separate iron oxide from the water of said sample and to retain substantially all of the iron oxide on said filter, and comparing the color of the iron oxide retained on said filter with a color standard to obtain a quantitative value of the iron in said boiler feed water.

References Cited in the file of this patent

UNITED STATES PATENTS

| | | |
|---|---|---|
| 2,113,063 | Stryker | Apr. 5, 1938 |
| 2,122,824 | Pick | July 5, 1938 |
| 2,554,414 | McClendon | May 2, 1951 |
| 2,602,729 | Curry | July 8, 1952 |
| 2,838,378 | Shawhan | June 10, 1958 |

OTHER REFERENCES

Sandell: Col. Determ. of Traces of Metals, 1944 ed., vol. III, page 270.

Scott: Standard Methods of Chem. Analysis, vol. 1 (1925), pages 249 to 256.